United States Patent [19]
Folkert

[11] 3,774,845
[45] Nov. 27, 1973

[54] ORCHARD SPRAYER

[75] Inventor: Henry Folkert, Granger, Wash.

[73] Assignee: Bank of Sunnyside, an Office of Bank of Yakima

[22] Filed: Oct. 30, 1972

[21] Appl. No.: 301,980

[52] U.S. Cl. .................................................. 239/78
[51] Int. Cl. ............................................. A01n 17/08
[58] Field of Search .............................. 239/77, 78

[56] References Cited
UNITED STATES PATENTS
| | | | |
|---|---|---|---|
| 2,641,504 | 6/1953 | Robinson | 239/78 |
| 2,801,044 | 7/1957 | Bowie | 239/77 X |
| 3,315,894 | 4/1967 | Funk | 239/78 |

*Primary Examiner*—M. Henson Wood, Jr.
*Assistant Examiner*—John J. Love
*Attorney*—Marvin E. Jacobs

[57] ABSTRACT

An orchard sprayer unit mounted on a trailer which discharges a radial spray about the rearward end of the unit to spray adjacent trees and crops is described. A novel arrangement of shutters are provided about the discharge end of a fan unit to control the discharge direction and velocity of the spray in desired sectors of the radial discharge. The liquid to be sprayed is atomized by injecting a stream of liquid perpendicularly at low pressure past the edge of the shutter into the high velocity air flow being radially discharged about the rear of the unit. The air flow tears the liquid stream from the edge of the shutter, uniformly atomizes the stream and projects the droplets into the crop being treated. Each shutter is provided with a nozzle for spraying the liquid at low pressure, so by selection of shuttering and nozzle size, virtually any radial spray pattern with portions of varying concentration and velocity can be obtained permitting, for example, an upper portion of a tree to receive a greater amount of spray treatment than the lower portion.

11 Claims, 3 Drawing Figures

ORCHARD SPRAYER

BACKGROUND OF THE INVENTION

1. Field of the Invention

The present invention relates generally to orchard spraying apparatus for spraying trees and plants at their various heights, and more particularly, to an improved orchard spraying apparatus which performs more efficiently and effectively than units heretofore available.

2. History of the Prior Art

The conventional type of orchard sprayer presently in use usually consists of a unit mounted on a trailer which is either self-powered or driven by the power take-off of the tractor pulling the trailer. These units are provided with a large capacity fan which draws the air in axially and discharges it radially with a plurality of spaced fluid nozzles disposed within the air stream and discharging in the same direction as the air from the fan. The nozzles discharge a fluid such as insecticide into the stream of air discharged from the fan, thus dispersing the fluid in a relatively fine spray in a large circular or semi-circular pattern. While these units generally perform their intended function adequately, in many instances an economical application is precluded due to the limitations of the control and adjustment of the amount and the rate of fluid being discharged from each nozzle and the speed of the air being discharged from the fan.

It is well recognized in the field of orchard and crop spraying that certain factors affecting coverage such as fluid output from each nozzle, the speed of the air being discharged from the fan, and the speed that the unit is being moved past the trees or plants are controllable and can very well make the difference between an economical spraying operation and a spraying operation resulting in poor coverage and waste of materials.

SUMMARY OF THE INVENTION

Accordingly, it is the general aim of the present invention to provide a new and improved orchard spraying unit which will provide a greater degree of control and adjustment of spray, amount, pattern and coverage than has heretofore been possible.

It is another object of the invention to provide an improved air discharge arrangement from the fan which enables the operator to change horsepower requirements to fit any size tractor as well as accommodate any type of crop.

Still another aim of the present invention is to be able to discharge the fluid to be sprayed from the nozzles at a lower pressure than has heretofore been possible, thereby eliminating high-pressure pumps, reducing nozzle wear and allowing the use of low-capacity electric pumps thereby eliminating valves and providing positive on and off controls.

It is another object of the invention to provide a relatively lightweight and low cost orchard spraying unit that may be readily disassembled for servicing purposes and which requires a lower power input and which enjoys a greater life expectancy than do conventional orchard spraying units.

The orchard spray unit in accordance with the invention generally includes an elongated fan chamber, and a powered fan disposed within the chamber for drawing air into the forward end and discharging air at high velocity from the rearward end. An annular discharge baffle, preferably having a curved cross section terminating in an upward generally perpendicular edge is disposed generally coaxially proximate to the rearward end of the chamber.

A plurality of adjacent, individually adjustable shutters are slidingly mounted on the rearward periphery of the chamber and are adjustable from a wide-open position conincident with the rear edge of the chamber to a fully closed position adjacent the ring. A fluid nozzle is mounted on a plurality of the shutters, preferably forward of the rear edge of the shutter. Each shutter is connected to a liquid pump.

When the fan and pump are actuated, the high velocity air within the chamber will follow the curvature of the baffle ring and will be discharged in a radial pattern about the upper edge of the baffle. The pump discharges a stream of liquid perpendicularly from each open nozzle. As the air stream flows past the edge of the nozzle, it efficiently and uniformly atomizes the air into droplets and forcefully carries the droplets onto the plant, crop or tree being treated.

The efficient distribution and uniform coverage provides lower gallonage per acre. The uniform droplet size, typically about 50 microns, is absent the large drops which may not carry to the crop and the very small droplets which drift away before reaching the crop. It is quite unexpected that such efficient application could be provided by such low gallonage and horsepower.

The adjustable louvers provide unusual versatility to the sprayer. The spray pattern is readily adjusted to deliver the liquid where it is most needed. The louvers can be opened or closed as required, to match the horsepower available from the pulling tractor.

BRIEF DESCRIPTION OF THE DRAWINGS

The above stated and other objects and advantages of the instant invention will readily appear from the following description taken in conjunction with the accompanying drawings in which.

Figure 1:
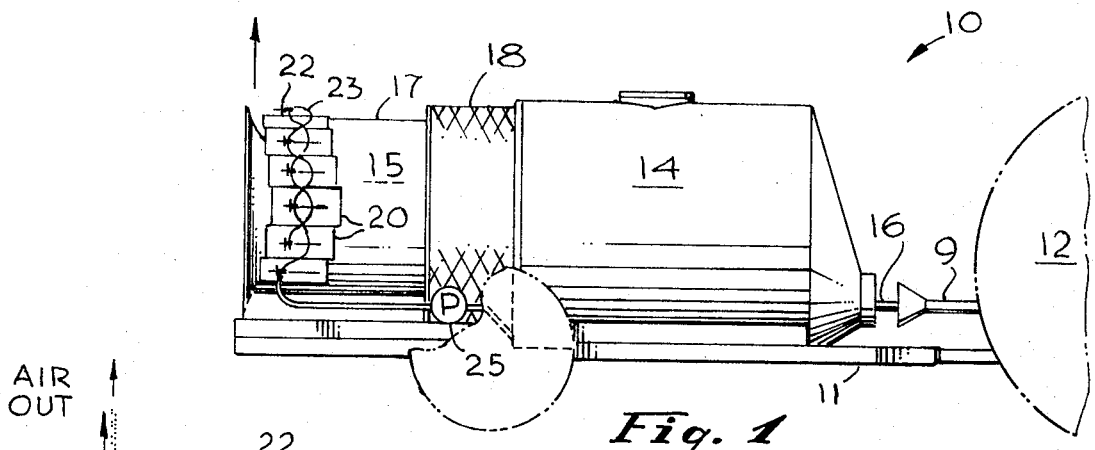
FIG. 1 is a side elevation of an exemplary orchard spraying unit embodying the features of the present invention.

While the present invention is susceptible of various modifications and alternative constructions, the illustrative embodiment shown in the drawings will herein be described in detail. It should be understood, however, that it is not intended to limit the invention to the particular forms disclosed, but, on the contrary, the invention is to cover all modifications, equivalents and alternative constructions falling within the spirit and scope of the invention as expressed in the appended claims.

DESCRIPTION OF THE PREFERRED EMBODIMENT

Referring initially to FIG. 1, an exemplary orchard sprayer unit generally indicated at 10, is illustrated. The unit includes a trailer 11 adapted to be pulled by a tractor 12, a tank 14 for holding the material to be sprayed, and a fan 15 which in the exemplary unit 10 is driven by a shaft 16 attached to the power take-off 9 of the tractor 12 and which in turn is connected to a step-up transmission 18 which in turn drives the fan 15. The trailer 11 preferably includes the steering system disclosed in my copending application Ser. No. 214,580, filed Jan. 3, 1972.

Figure 2:
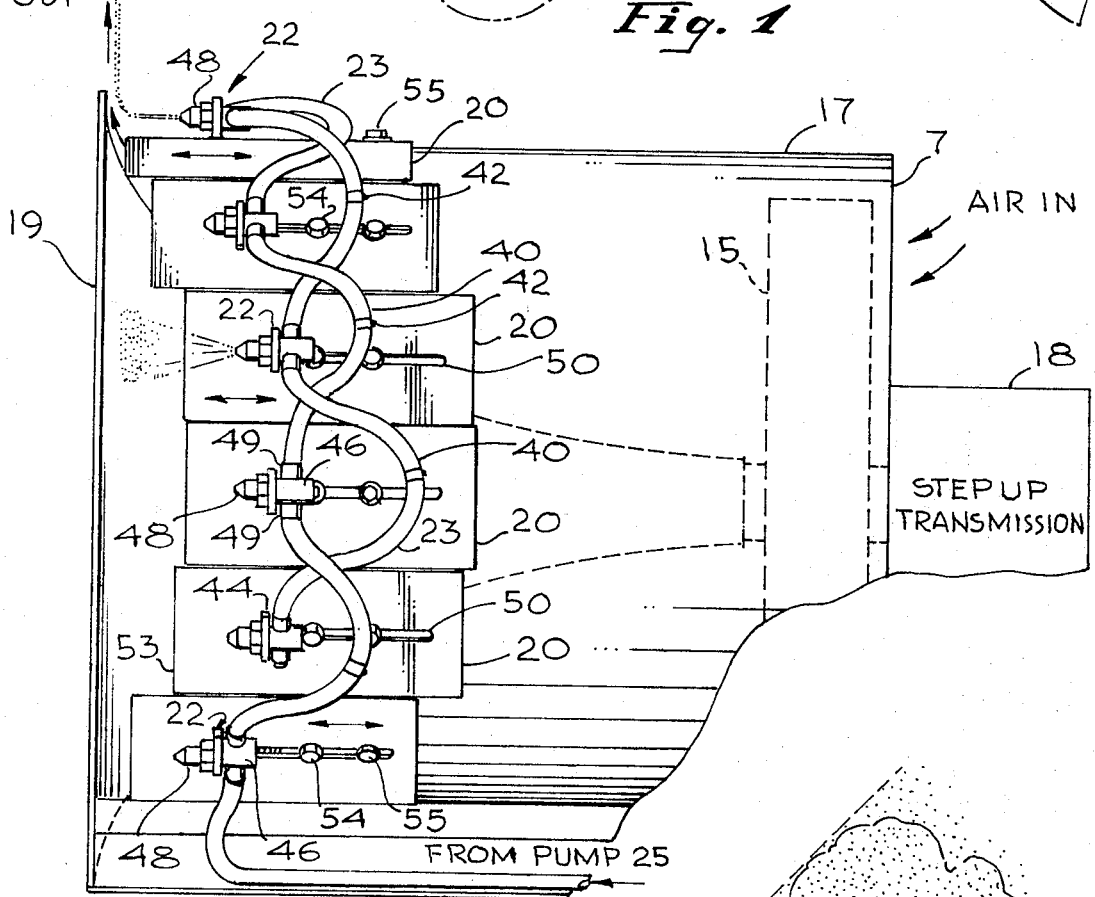
FIG. 2 is an enlarged, fragmentary, side elevation of the fan, air discharge and nozzle portions of the unit illustrated in FIG. 1.

As best shown in FIG. 2, the fan 15 is disposed in a cylindrical chamber 17 whereby the operation of the fan draws air into the chamber 17 at the forward end 7 of the chamber about the step-up transmission 18 and discharges the air at the rearward end of the chamber 17.

In order to radially discharge the air drawn through chamber 17 by the fan 15, an annular discharge ring 19 is provided at the rearward end of the chamber 17 with an outer surface facing the interior chamber 17 which is curved so as to deflect the air exiting the chamber 17 whereby the air is discharged radially about the sides and upper portion of the discharge ring 19.

In order to disperse the fluid to be sprayed, a plurality of fluid nozzles 22 are mounted in a spaced relationship about the rearward end of the chamber 17 and connected by a flexible hose arrangement 23 to the fluid tank 14.

The hose 23 is connected to every other nozzle 22 in a circuitous path forming bends 40 which provide sufficient travel for cyclical positioning of the nozzles 22 without unduly fatiguing the hose 23. The hose is secured by clips 42. A hose 23 on each side of the chamber 17 may alternate connection to the top nozzle 22 and terminate in the next to last nozzle 44. Since nozzle 44 is at a low level, this provides an antisyphon effect eliminating the need for on-off valves and providing protection when using centrifugal-type liquid pumps.

The nozzles 22 are formed of a body portion 46 having a threaded front recess for receiving a nozzle tip 48 and two side flanges 49 for receiving hose 23. The tip 48 may be a plug to selectively close off the liquid supply or a circular or slot-shaped tip. Slot-shaped tips having spray angles of about 80 percent are preferred since they inject a flat stream which minimizes liquid falling into the blower assembly and fosters uniform atomization.

The nozzle 22 is secured to the rearward end of a slot 50 formed in the shutter 20 with the tip 48 disposed forward of the edge 53 of the shutter 20. A pair of spaced bolts 54 and 55 are threadingly received within suitably located threaded apertures in the body of chamber 17. The stationary nozzle 22 abuts bolt 54 in the fully opened position and moves forward with the shutter 20 in the intermediate or closed positions of the shutter 20.

Figure 3:
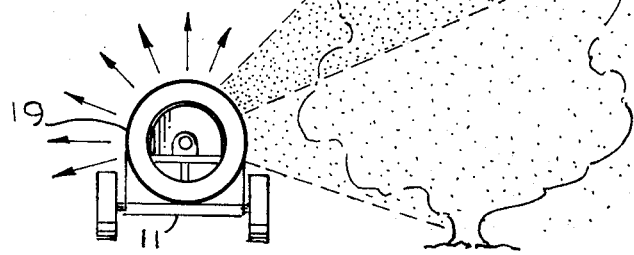
FIG. 3 is a rear view of the orchard sprayer unit shown in FIG. 1 depicting the unit in operation while spraying a tree in an orchard.

A low-capacity fluid pump 25, typically about 6 psi, such as, for example, the electrically driven centrifugal type is disposed between the nozzles 22 and the tank 14. Each nozzle 22 is directed to discharge the fluid in a spray pattern at relatively low pressure in the same direction as the chamber 17. There is very little atomization of the liquid at the low pressure delivery from the nozzle. As diagrammatically depicted in FIG. 3, when the fluid spray exiting each nozzle 22 at relatively low pressure encounters the high-velocity discharge of air being directed radially about the chamber 17 by virtue of the discharge ring 19, the low-pressure spray from each nozzle 22 is deflected by the said radial air discharge and is effectively atomized by the high-velocity air discharge and carried in the same direction as this discharge. The air stream appears to create a vortex in the vicinity of the edge of the shutter and appears to tear the liquid away from the edge to form a uniformly atomized dispersion. Accordingly, unlike conventional available units which discharge from the spray nozzle in the same direction as the air being discharged from a centrifugal fan thereby requiring the fluid to be discharged from each nozzle at extremely high pressure, the instant invention achieves superior results utilizing a low-pressure reliable fluid discharge system.

It will be further readily apparent to those skilled in the instant art that the size of the respective nozzles 22 can be varied by the operator to control the amount of fluid atomized in any given portion of the spray pattern. The reason for this is that it has been found when spraying trees in an orchard, for example, that the larger amount of spray should be directed to the upper portion of the tree.

In order to control the volume of high-velocity air passing each respective fluid discharge valve 22, each said valve is mounted on a slidable shutter 20 which comprise the rearward end of the fan chamber 17. Each shutter 20 can be selectively moved and retained at any position from that substantially closing off the flow of air past the particular nozzle 22 thereon, to a relatively wide-open position.

In addition to providing additional control as to the amount of atomization and coverage from each nozzle 22, it is further pointed out that by selectively opening and closing the respective shutters 20 along with utilizing the selected sizes of nozzles 22 or shutting them off completely, virtually any spray pattern desired from that required for low bushes to that necessary for extremely high trees and overhead foilage is available without any unnecessary waste of power or material. Even further, since larger openings between the shutters 20 and the discharge ring 19 require a greater power requirement to move an equivalent ring volume of air through such opening, the present invention permits the shutters 20 to be closed down to accommodate a lower horsepower input when necessary.

In addition to the aforestated advantages of discharging the fluid at low pressure into a high-velocity stream of air moving substantially perpendicular to the fluid discharge, it has been found that the atomization of the spray provides extremely uniform droplet size being deposited on the crops in addition to having available an infinite range of application rates. Furthermore, the penetration of the crop is so favorable that gallonage requirements of chemicals are reduced.

What is claimed is:

1. An orchard sprayer unit of the type mounted on a trailer and adapted to be drawn by a tractor adjacent to rows of trees or crops to be sprayed comprising:

a wheeled trailer frame adapted to be attached to and drawn by a tractor;

a tank for holding the liquid chemical to be sprayed mounted on said frame;

an elongated fan chamber of generally cylindrical cross section mounted on the rearward portion of said trailer frame;

a powered fan disposed within said chamber for drawing air into the forward end of said chamber and discharging air at high velocity at the rearward end of said chamber;

an annular discharge ring disposed proximate to the rearward end of said chamber in a generally coaxial relationship therewith and having a curved cross section terminating in an upward edge disposed generally perpendicular to the axis of said ring, fan and chamber whereby air discharged at high velocity from said fan follows the curvature of said ring and is discharged radially about said upper edge;

a plurality of adjacent and individually adjustable shutter means mounted about said fan chamber and defining the rearward end thereof, each said shutter means moveable between a position substantially adjacent to and touching said discharge ring thereby shutting off substantially all air flow from the fan past that portion of the rearward end of said fan chamber defined by said shutter means, and a generally wide-open position permitting a large volume of air from the fan to flow past said portion; and a fluid nozzle mounted on substantially each said shutter means operatively connected to a liquid pump connected to said tank, each said nozzle being mounted in a manner whereby upon actuation of said fan and said liquid pump each said nozzle will spray liquid from said tank into the flow of the high pressure discharge of air proximate to the said upward edge of said discharge ring and in a generally perpendicular relationship thereto whereby upon impinging the high pressure air flow, the liquid sprayed thereinto is atomized and radially discharged with said air about said fan chamber past those of said shutter means that are in an open position so as to permit such discharge.

2. The orchard sprayer unit as set forth in claim 1 wherein each said shutter means can be selectively located and affixed at any position between said shut and said wide-open position.

3. The orchard sprayer unit according to claim 2 in which the nozzle opening is disposed forward of the rearward edge of the shutter.

4. The orchard sprayer unit as set forth in claim 1 wherein said fan is adapted to be powered by a power take-off on a tractor pulling the unit.

5. The orchard sprayer unit as set forth in claim 4 further including a step-up transmission disposed between the tractor power take-off and said fan.

6. The orchard sprayer unit as set forth in claim 5 wherein said step-up transmission is disposed at the forward end of said fan chamber and between said chamber and said tank.

7. The orchard sprayer unit according to claim 1 in which the pump is a low-pressure pump.

8. The orchard sprayer unit as set forth in claim 1 wherein each said fluid nozzle is adjustable so as to be selectively maintained in a closed position or to deliver any desired spray volume and pattern.

9. The orchard sprayer unit as set forth in claim 1 wherein each of said plurality of shutter means comprises a slidably mounted plate.

10. The orchard sprayer unit as set forth in claim 1 wherein said plurality of shutter means are sufficient to provide separate control of the air discharged radially about said discharge ring at at least two separate and distinct sections about said ring.

11. An atomization sprayer comprising in combination:

an elongated fan chamber having a rearward end and a forward end;

a powered fan disposed within said chamber for discharging a flow of air toward the rearward end;

baffle means spaced a selected distance from the rearward end for directing the air flow in a radial pattern perpendicular to said axis;

a plurality of adjacent and individual shutters slidingly and adjustably mounted on the rearward end of said chamber, each shutter being extendible from a first position abutting said baffle means;

a fluid injecting nozzle mounted on a plurality of said shutters with the rearward end facing said baffle and disposed forward of the edge of the shutter; and means for delivering liquid to said nozzles.

* * * * *

UNITED STATES PATENT OFFICE
CERTIFICATE OF CORRECTION

Patent No. 3,774,845                    Dated November 27, 1973

Inventor(s) Henry Folkert

It is certified that error appears in the above-identified patent and that said Letters Patent are hereby corrected as shown below:

Column 2, line 7, "conincident" should read --coincident--; lines 54-55, "invention" should read --intention--. Column 3, line 39, "80 percent" should read --80°--. Column 4, line 22, "comprise" should read --comprises--; line 38, after "equivalent" delete "ring". Column 5, line 10, "moveable" should read --movable--. Column 6, line 34, after "position" insert --at least coincident with said rearward end to a second position--.

Signed and sealed this 2nd day of April 1974.

(SEAL)
Attest:

EDWARD M. FLETCHER, JR.          C. MARSHALL DANN
Attesting Officer                Commissioner of Patents